Figure 1:
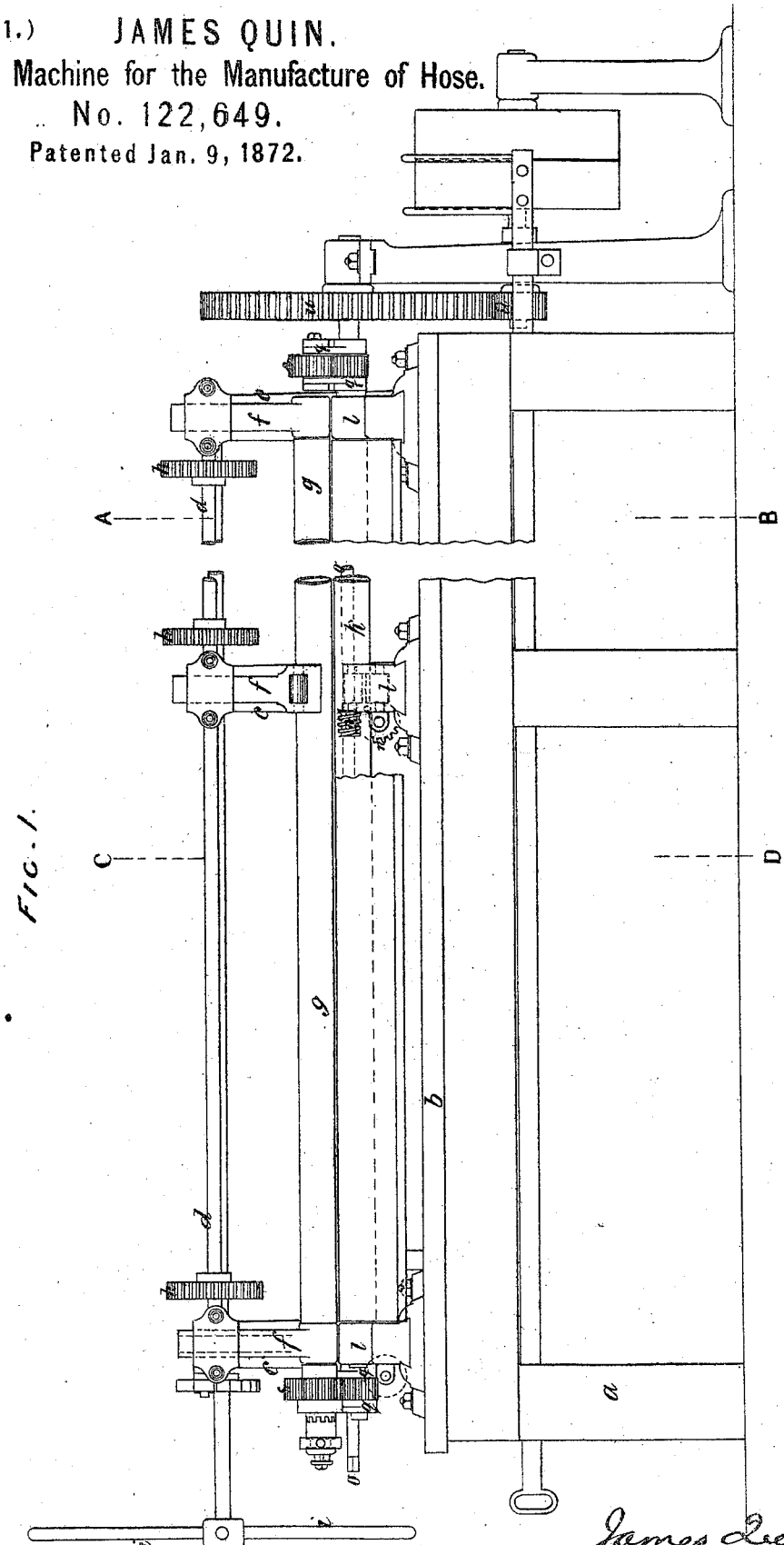

3 Sheets--Sheet 3.

JAMES QUIN.

Machine for the Manufacture of Hose.

No. 122,649.   Patented Jan. 9, 1872.

WITNESSES  John Parker
J. B. Harding

James Quin
By his Atty
Hurzen and Son

UNITED STATES PATENT OFFICE.

JAMES QUIN, OF LEYLAND, NEAR PRESTON, KINGDOM OF GREAT BRITAIN AND IRELAND.

IMPROVEMENT IN MACHINES FOR THE MANUFACTURE OF RUBBER HOSE.

Specification forming part of Letters Patent No. 122,649, dated January 9, 1872.

SPECIFICATION.

I, JAMES QUIN, of Leyland, near Preston, in the county of Lancaster, Kingdom of Great Britain and Ireland, India-rubber manufacturer, have invented Improvements in Machinery or Apparatus to be employed in the Manufacture of Hose and other similar piping, of which the following is a specification:

This invention relates to machinery for manufacturing India rubber and other suitable elastic or flexible substances into hose or tubing, and the improved machinery or apparatus is constructed as follows: At the top of a suitably-formed framing I attach, by convenient means, a series of pinions, which gear into racks connected to or forming part of the hanging supports of a roller. Under this roller are arranged two other similar rollers, which are mounted in slides, and are capable of being moved further apart or nearer together, as required. These rollers may revolve and bear on small friction-rollers placed in a line parallel to their axes and supported in convenient positions in the slides before named. A mandrel of the required diameter is first coated with India rubber (for example) by taking a piece of sheet rubber of the requisite length and of a width rather more than equal to the circumference of the mandrel, round which it is rolled and a lap-joint formed. This mandrel is then placed in the machine and a piece of woven cloth saturated or coated with India rubber or other adhesive cement or material, and of a sufficient width to form the number of laps or plies required, is introduced into the machine with its forward edge in contact with the India-rubber coating of the mandrel. Upon the outer edge of the cloth is placed a piece of sheet rubber of a width rather more than equal to the outer circumference of the finished tube. The top roller being lowered till it presses on the material on the mandrel, a few turns of the rollers effects the required rolling and finishing, and a length of hose-pipe is completed at one operation, having a coating of sheet rubber inside and out and as many laps or plies of cloth between as may be required, according to the width of the material and the diameter of the mandrel employed.

Such being the nature and object of my said invention, in order to enable others skilled in the art to make and use the same, I will now proceed to describe more in detail the manner in which the said invention is to be, or may be, carried into practical effect, which will be readily understood from the following explanation thereof, reference being had to the annexed drawing and the figures and letters marked thereon.

Figure 2:
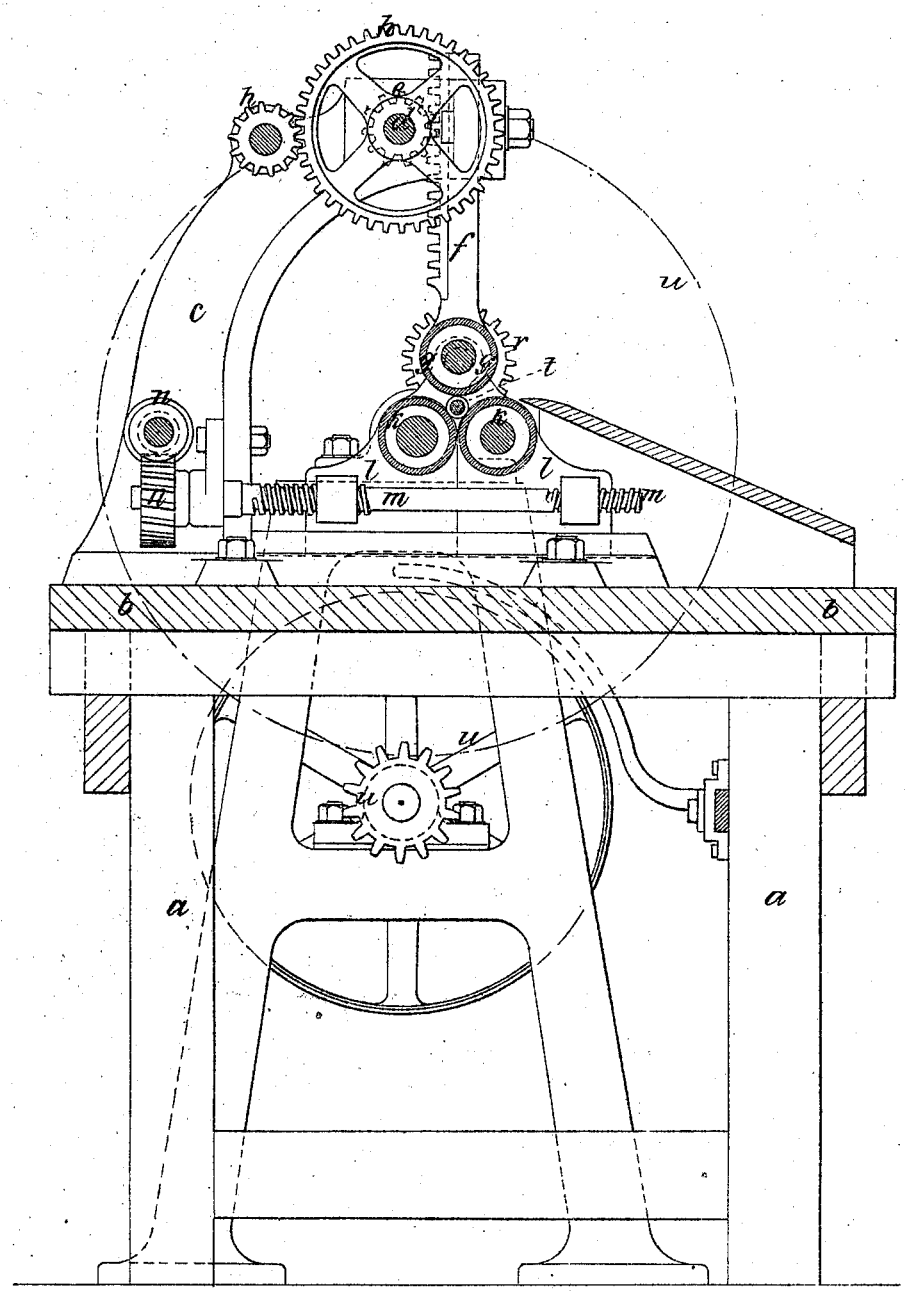
Figure 3:
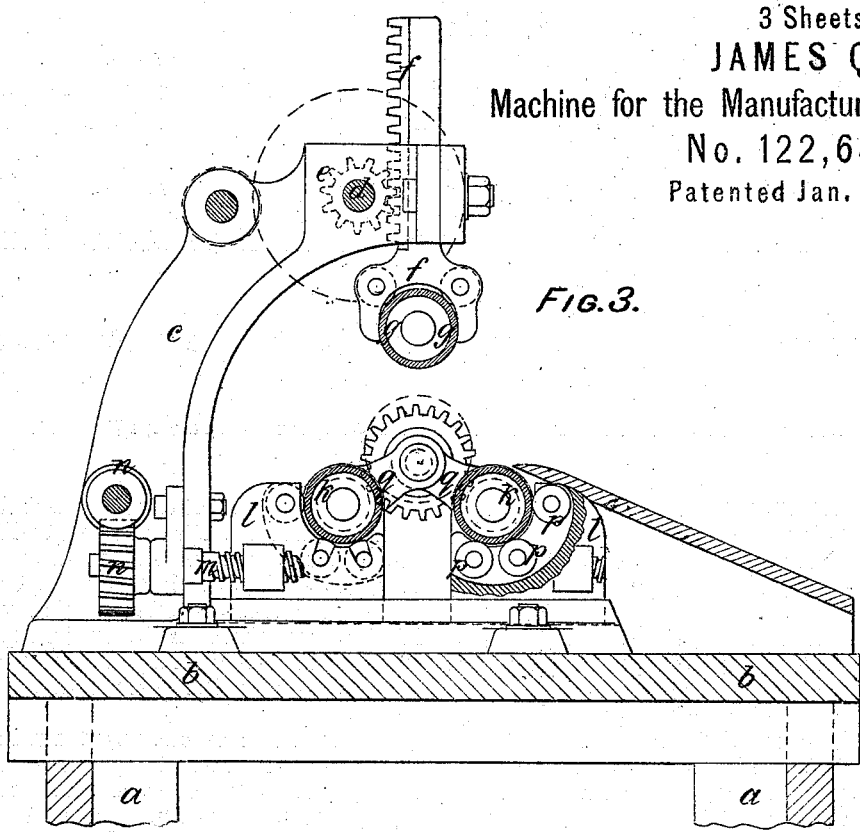
Figure 4:
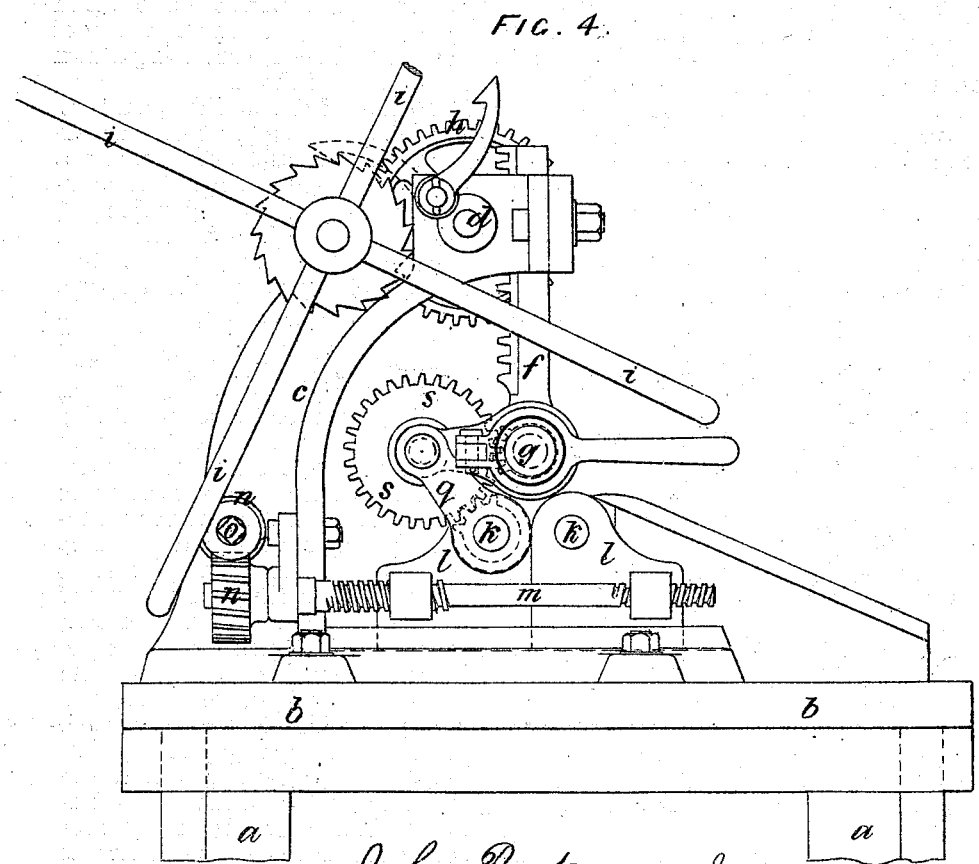

Figure 1 in the accompanying drawing represents a front elevation of my improved machine, drawn to a scale of about one inch to a foot. Fig. 2 is a transverse section through about the line A B in Fig. 1. Fig. 3 is a similar view taken through about the line C D in the same figure, and Fig. 4 is an end view of the machine; these three figures being drawn about twice the scale of Fig. 1.

$a\ a$ is the framing of the machine, supporting the bed $b\ b$. $c\ c$ are supports or brackets placed at suitable intervals and carrying a long shaft, $d\ d$, on which are mounted spur-pinions $e\ e$, gearing into toothed racks $f\ f$, forming part of the hanging-support of the top roller $g\ g$. These pinions are put in motion by the spur-gearing $h\ h$, actuated by the cross-handles or levers $i\ i$. The two bottom rollers $k\ k$ are mounted in slides $l\ l$, and can be brought close together for making small tubes, as shown at Fig. 2, or moved further apart for making large tubes, as shown at Fig. 3, by means of right-and-left-hand screws on a shaft, $m\ m$, actuated by the worm and wheel $n\ n$, being put in motion by a winch-handle fitted onto the squared end $o\ o$ of the worm-shaft. It will be seen upon referring to Fig. 3 that these bottom rollers are supported at intervals throughout the length by means of short friction-rollers $p\ p$, and they are connected together at their ends by means of links $q\ q$, so that the carrier-wheel $r\ r$, which connects them, always remains in gear, whatever their relative position may be. The carrier-wheel $s\ s$, which drives the top roller $g\ g$, is also similarly arranged, as will be seen on reference to Fig. 4. The mandrel $t\ t$, with the tube thereon, in process of being rolled, is shown in its working position between the three rollers at Fig. 2.

Motion is communicated to the machine by means of the spur-wheel and pinion $u$ $u$, being actuated by a strap passing round the driving-pulley $v$ $v$.

Claims.

1. The combination of the upper adjustable roller $g$ and the bottom rollers $k$ $k$, turning in bearings adjustable by the screw-shaft $m$ or its equivalent, substantially as described.

2. The combination of the subject-matter of the foregoing claim and the rollers $p$ $p$, arranged substantially as and for the purpose set forth.

3. The combination of the rollers $k$ $k$, links $q$ $q$, and driving-pinion $r$, substantially as and for the purpose set forth.

4. The combination of the roll $k$, roll $g$, and a shaft connected by links to both rolls, and carrying the driving pinion $s$, substantially as described.

In testimony whereof I have signed my name to this specification in the presence of two subscribing witnesses.

JAMES QUIN.

Witnesses:
   GEORGE DAVIES,
   ARTHUR PERKINS. (81)